UNITED STATES PATENT OFFICE.

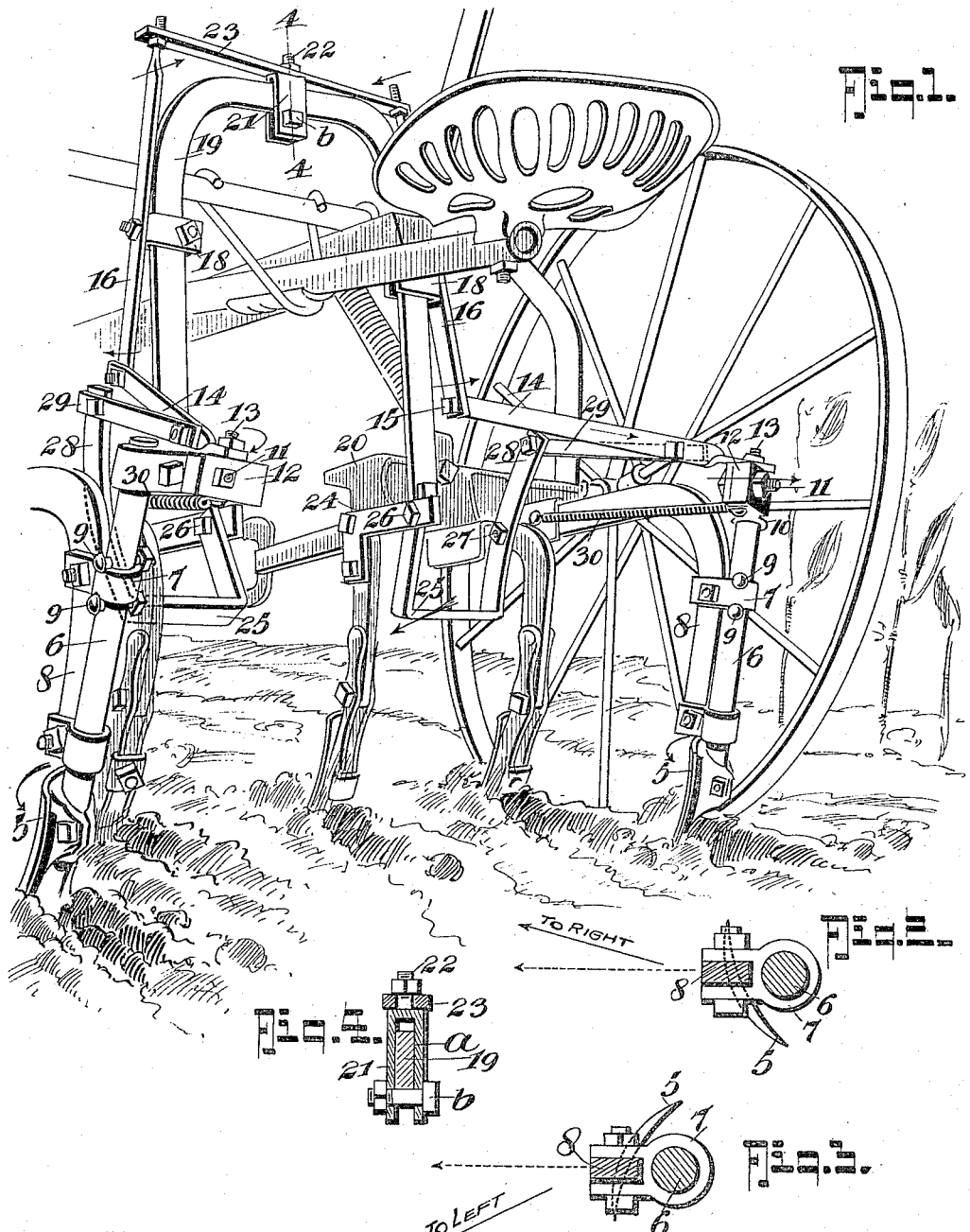

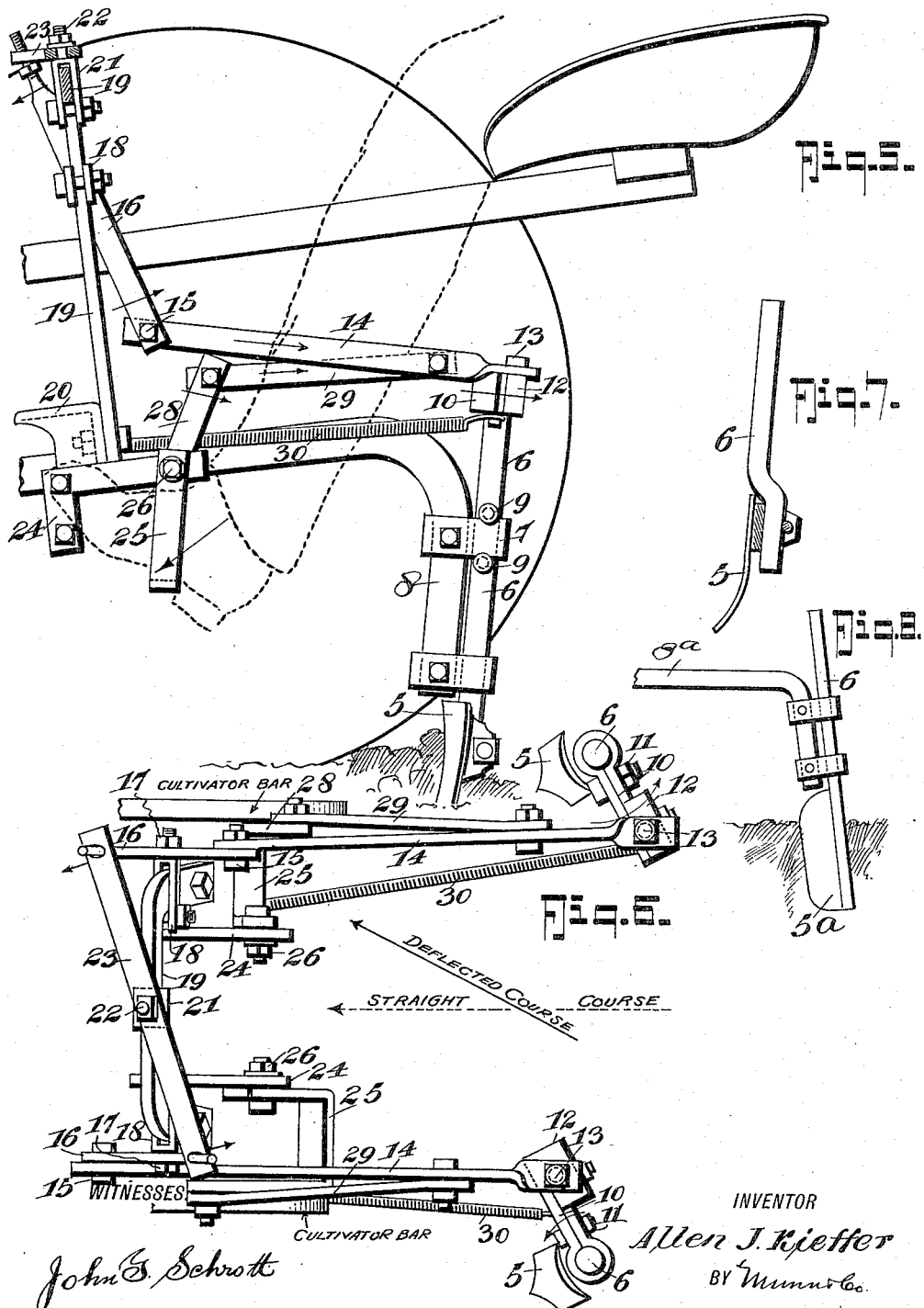

ALLEN JEROME KIEFFER, OF NEVADA, OHIO.

CULTIVATOR.

1,168,943.    Specification of Letters Patent.    Patented Jan. 18, 1916.

Application filed September 4, 1915. Serial No. 49,027.

*To all whom it may concern:*

Be it known that I, ALLEN J. KIEFFER, a citizen of the United States, and a resident of Nevada, in the county of Wyandot and State of Ohio, have invented certain new and useful Improvements in Cultivators, of which the following is a specification.

The invention is an improvement in guiding attachments for gang cultivators.

One of the objects of my invention is to provide a cultivator attachment in the nature of a device to be attached to, or made a part of, a riding cultivator, for controlling the operation of at least one of the shovels or other ground engaging tool, in such manner that these shovels or tools may be shifted to lie at an angle with the direction of travel of the cultivator, so that as the latter moves along the shovel gangs will be moved to the right or to the left, as the case may be, by the action of the ground against the shovel or tool, in order to avoid cutting or uprooting the plants being treated.

A further object of the invention is to provide a device of the class described in the nature of a foot operable means connected with pivotally mounted members in each shovel gang through a suitable mechanism under the control of the driver of the cultivator, means being provided for simultaneously operating the shovels in each gang.

A still further object of the invention is to provide a device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed and illustrated in the accompanying drawings, in which like characters of reference indicate like parts throughout the several figures, in which—

Figure 1 represents a view in perspective of a cultivator equipped with an attachment constructed in accordance with my invention. Fig. 2 represents a sectional view taken horizontally above one of the guide shovels, showing the position assumed by the same in moving the shovel gangs to the right with respect to the direction of travel of the cultivator. Fig. 3 represents a similar view showing the position assumed by the shovel in moving the gangs to the left. Fig. 4 represents a view in section taken transversely on the plane indicated by the line 4—4 of Fig. 1; Fig. 5 represents a view showing a portion of the mechanism in side elevation; Fig. 6 represents a top plan view of the attachment; Fig. 7 represents a view partially in section through a guide shovel in which the shank is offset at its lower end in order to aline the shovel with the center of the shank; Fig. 8 represents a view in elevation showing the application of a modified guiding element to the device.

Referring more particularly to the drawings, it will be noted that the device is shown as attached to a riding cultivator of well known construction, one shovel 5 of each of the two gangs with which the cultivator in this instance is equipped, being securely mounted upon the lower end of a shank 6. The arrangement whereby the guiding shovel or member of each gang is controlled, is the same on each side of the cultivator, so that it will only be necessary to describe this mechanism with respect to one side.

The shank 6 is journaled in bearings 7 connected to one of the cultivator arms 8, so that said shank may be turned to the right or to the left upon a vertical axis. Pins 9 which extend out from the shank 6 above and below one of the bearings 7, serve as means for preventing vertical movement of the shank relative to the arm.

The upper end of the shank is provided with an inwardly extending arm 10 suitably secured thereto and preferably formed of a strip of metal looped centrally about the shank and having its ends bolted together, as at 11 at a point adjacent the shank.

A block 12 may be bolted to the arm 10 to serve as means for retaining a pivot pin 13 in place. A link 14 is pivoted at its rear end upon this pin and at its forward end is pivoted at 15 to the lower end of a vertically arranged lever 16. The latter at its central portion is pivoted at 17 upon a clip 18 secured to one side member of a substantially vertically arranged yoke 19.

The yoke is secured at its ends to the members 20 with which the right and left plow gangs are associated. Through this yoke connection motion imparted to the right or to the left to one of these plow gangs, will be transmitted to the other gang for likewise shifting it over to the right or to the left.

Upon the top of the yoke 19 is secured a clip 21 supporting a pin 22 upon which a horizontal lever 23 is centrally journaled. The upper ends of the vertical levers 16 extend loosely through openings provided adjacent the ends of lever 23, as clearly indicated in Fig. 6, and thus loose connections are established between levers 16 and the lever 23.

The clips 18 and 21 are substantially identical in construction, and as indicated in Fig. 4, each consists of a substantially U-shaped member $a$ straddling the yoke and provided adjacent its ends with a bolt or other suitable fastening means $b$ for binding the U-shaped member upon said yoke, the pivot pin being suitably welded or cast onto the U-shaped member.

To each of the members 20 at its inner end is suitably secured an angle iron 24 providing a rearwardly extending arm. One side of a foot operable stirrup 25 is pivoted to this arm with a bolt as at 26, the opposite side of the stirrup being similarly pivoted as at 27 to one of the shovel arms. The latter stirrup side is extended upwardly as at 28, and at its upper end is connected by means of a link 29 to the link 14 at a point adjacent the rear end of the latter.

Normally the guiding shovel 5 is retained at right angles to the direction of travel of the machine, through the operation of a retractile spring 30 connected at its rear end with the arm 10, and at its forward end with the element 20, or other suitable anchorage. If, while the machine is in motion, it is desired to shift the cultivator gangs, say to the right, the operator engages the right hand stirrup 25 with his foot and depresses the same. This results in the rearward shifting movement of the links 29 and 14, thus rotating the shank 6 whereby to shift the right hand guiding shovel from a position at right angles to the direction of travel of the machine, to an angular position, as indicated in Fig. 2, so that the shovel is arranged slantwise with respect to the direction of travel of the cultivator. Simultaneously the right hand lever 16 is swung upon its pivot, so that its upper end moves forwardly, thus shifting the opposite end of the horizontal lever 23 to that with which the upper end of the lever 16 is connected rearwardly, and hence through the medium of the left hand lever 16 and link 14, shifting the left hand guiding shovel from a position at right angles to the direction of travel of the machine, to a position parallel with that assumed by the right hand guiding shovel. In this manner, both guiding shovels are simultaneously shifted to lie in parallel relation with each other and at an inclination to the direction of travel of the cultivator, whereby to engage the earth at an angle so as to draw the cultivator gangs over toward the right hand side of the machine. If the foot pressure is then removed from the stirrup, the spring 30 on the right hand side of the machine will draw the right hand guiding shovel back into normal position and through the action of the mechanism already explained, the other guiding shovel will also be returned to normal position so that the gangs will remain stationary with respect to the direction of travel of the machine. When it is desired to shift the shovel gangs to the left, a reverse operation of the parts from that already described, will take place in such manner as to move the gangs toward the left hand side of the machine.

In Fig. 8 a guiding element in the nature of a knife or blade is shown. It might at times be desirable, in order to suit the conditions and kind of soil being treated, to use such a guiding implement instead of the ordinary cultivator shovel. In the figure, 5$^a$ represents the knife which is suitably connected to the lower end of the shank 6, and which normally lies in a parallel position to the direction of movement of the machine. The shank 6 is suitably journaled on an additional arm 8$^a$ securely connected in desirable manner with the shovel gang supporting means.

The forward edge of the knife may, if desired, be deflected to the right or to the left in the manner already described, so as to engage with the ground at an inclination to the direction of travel of the machine, and hence moved either toward the right or toward the left, as the case may be, as the cultivator travels along.

In Fig. 7 the lower end of the shank 6 is shown as offset rearwardly, in order that the shovel 5 may be disposed substantially in alinement with the recess of the shank. This construction will result in a ready and easy shifting movement of the shovel while in the ground.

My invention provides for the quick and ready guiding of cultivator gangs by an easy downward and forward pressure of the foot of the operator, so that the fatigue and strain experienced through the requirement of the side pressure of the leg of the operator in ordinary machines, is done away with. The guiding tools, namely, the cultivator shovel or blade, or any other desirable instrument which may be used while acting primarily as guiding implements, may at the same time continue to serve the function of the ordinary cultivator tool in cutting and disintegrating the soil.

Although I have described the preferred embodiment of my invention, I may desire to make such changes in the construction, combination, and arrangement of parts thereof, as do not depart from the spirit of the invention and the scope of the appended claims.

I claim:

1. The combination with a cultivator having a plurality of gangs, of a rigid yoke connecting the gangs, a horizontal centrally pivoted lever carried by the yoke, a pair of vertically arranged centrally pivoted levers having loose connections with the horizontal lever at their upper ends, a substantially vertical shank rotatably connected with one of the cultivator arms in each gang, a guiding element carried at the lower end of each shank, an inwardly extending arm carried at the upper end of each shank, a link connecting each inwardly extending arm with the lower portion of the adjacent vertical lever, a stirrup pivotally connected with each gang, a link connecting each stirrup with one of the first of said links, and a retractile spring connected with each inwardly extending arm at one end and with the adjacent cultivator gang at the opposite end for normally retaining the guiding element in such position as to prevent shifting movement of the cultivator gangs relative to the direction of travel of the cultivator.

2. The combination with a cultivator having a plurality of gangs, of a rigid yoke connecting the gangs, a horizontally arranged centrally pivoted lever supported by the yoke, a pair of vertically arranged centrally pivoted levers having loose connections with said horizontally arranged lever at their upper ends, pivoted guide elements associated each with one of the gangs, and including a laterally extending arm, a link connection between each laterally extending arm and the adjacent vertical lever, a stirrup pivotally connected with each gang, connecting means between each stirrup and the adjacent lateral arm, and resilient means for normally retaining the guiding elements in position to prevent shifting movement of the gangs relative to the direction of travel of the cultivator.

3. The combination with a cultivator having a plurality of gangs, of a pivoted ground engaging guide member connected with each gang, means for normally maintaining the guide members in position to prevent shifting movement of the gangs relative to the direction of travel of the cultivator, rigid connecting means between the gangs, a foot operable stirrup connected with each gang having a link and arm connection with the adjacent guiding element whereby to shift it at will, and a lever and a link connecting means supported by said rigid gang connecting means whereby shifting movement imparted to one of the guiding elements will be simultaneously imparted to the other.

4. The combination with a cultivator including a plurality of gangs, of a pivoted ground engaging guiding element associated with each gang, a foot operable device connected with each guiding element for shifting it at will into inclined position with respect to the direction of travel of the cultivator whereby to move the gangs relative to the direction of travel of the machine, and means connecting the guide members whereby shifting movement imparted to one of them will be simultaneously imparted to the other.

5. The combination with a cultivator including a plurality of gangs, of a pivoted ground engaging guiding element connected with each gang, connecting means between the guiding elements whereby shifting movement imparted to one of them will be simultaneously imparted to the other for moving it into analogous position, a foot operable stirrup pivotally connected with each gang, and connecting means between each stirrup and the adjacent guiding element whereby the latter may be shifted at will.

6. The combination with a cultivator including a plurality of gangs, of a pivoted ground engaging guiding element connected with each gang, means for normally retaining the guiding elements in position to prevent movement of the gangs relative to the direction of travel of the cultivator, a rigid connecting means between the gangs, connecting means between the guiding means and supported by said rigid connecting means, whereby shifting movement imparted to one of the guiding elements will be imparted to the other for moving it into an analogous position, and means for shifting either of the guiding elements at will.

7. The combination with a cultivator including a plurality of gangs, of a ground engaging guiding element pivotally connected with each gang, connecting means between the guiding elements whereby shifting motion imparted to one of them will be simultaneously imparted to the other for moving the other into an analogous position, and means for shifting either of the guiding elements at will.

8. The combination with a cultivator of a ground engaging guiding element pivotally connected with the cultivator gang and movable relatively thereto, means for normally retaining the guiding element in position for preventing the shifting movement of the gang relative to the direction of travel of the cultivator, and foot operable means for shifting said guiding element relatively to the gang at will.

9. The combination with a cultivator having a plurality of gangs, of a ground engaging guiding element pivotally connected with each gang, foot operable means for shifting either of the guiding elements at will, and means operably connecting the guiding elements whereby shifting motion imparted to one of them will be simultaneously imparted to the other for moving the other into analogous position.

ALLEN JEROME KIEFFER.

Signed in presence of—
W. A. WOLFE,
D. W. KIEFFER.

Copies of this patent may be obtained for five cents each, by addressing the "Commissioner of Patents, Washington, D. C."